Oct. 26, 1937.     E. O. SCHJOLIN     2,096,981
VIBRATION DAMPER
Filed June 18, 1936

Inventor
Eric Olle Schjolin
By Blackmore, Spencer & Flint
Attorneys

Patented Oct. 26, 1937

2,096,981

UNITED STATES PATENT OFFICE 2,096,981

VIBRATION DAMPER

Eric Olle Schjolin, Pontiac, Mich., assignor to General Motors Corporation, Detroit, Mich., a corporation of Delaware Application June 18, 1936, Serial No. 85,843

10 Claims. (Cl. 192—30)

This invention relates to the transmission of power from an internal combustion engine and has particularly to do with a device to dampen the vibrations of the power shaft driven by the engine and connected to the transmission of an automotive vehicle.

In conducting experiments with a rear drive engine on an automotive vehicle, due to the fact that it was necessary to compact the drive mechanism from the engine to the rear drive axles, a transmission was designed in which the drive shaft passed through a hollow quill of the transmission and drove the quill through the intermediary of the clutch outside the transmission housing. The drive shaft inside the quill although made of a good grade of steel was found to be quite flexible because of its relatively small diameter. This drive shaft is shiftable as well as rotatable and has a tongue and groove or screw driver connection with the end of the crankshaft. The shaft was made shiftable so that it could operate the clutch. In operating the rear drive vehicle, the engine used was a two-cycle engine having four cylinders, and consequently for each rotation of the crankshaft there would be four impulses transmitted to the drive shaft and necessarily four twists to the shaft. Due to the resiliency of the shaft, these twists would first lag behind the crankshaft and then as the twists unwound, would send the shaft ahead of the crankshaft so that there was an alternate twisting back and forth of the shaft, which twisting occurred four times for each crankshaft revolution. Where the speed of the crankshaft is high, it can readily be appreciated that the number of twists to the crankshaft are excessively high. It was found that the crankshaft heated, and the heating became so bad that eventually it would warp and break. It was therefore necessary to devise some means successfully to dampen the vibrations or twists of the shaft so that it would have smoother running and would not heat. The transmission to which the shaft is applied and the clutch interrelated therewith, are shown and described in my co-pending application, S. N. 55,626, filed December 21, 1935. The damping of the shaft was accomplished by providing a collar on the drive shaft and equipping the adjacent mechanism with faces having friction material thereon, so that the friction between the collar and the friction surfaces will overcome the impulses transmitted to the drive shaft by the crankshaft. These friction surfaces are pressed against the collar by means of the clutch operating fork and by the Belleville washers which also act as the springs for the clutch.

Figure 1:
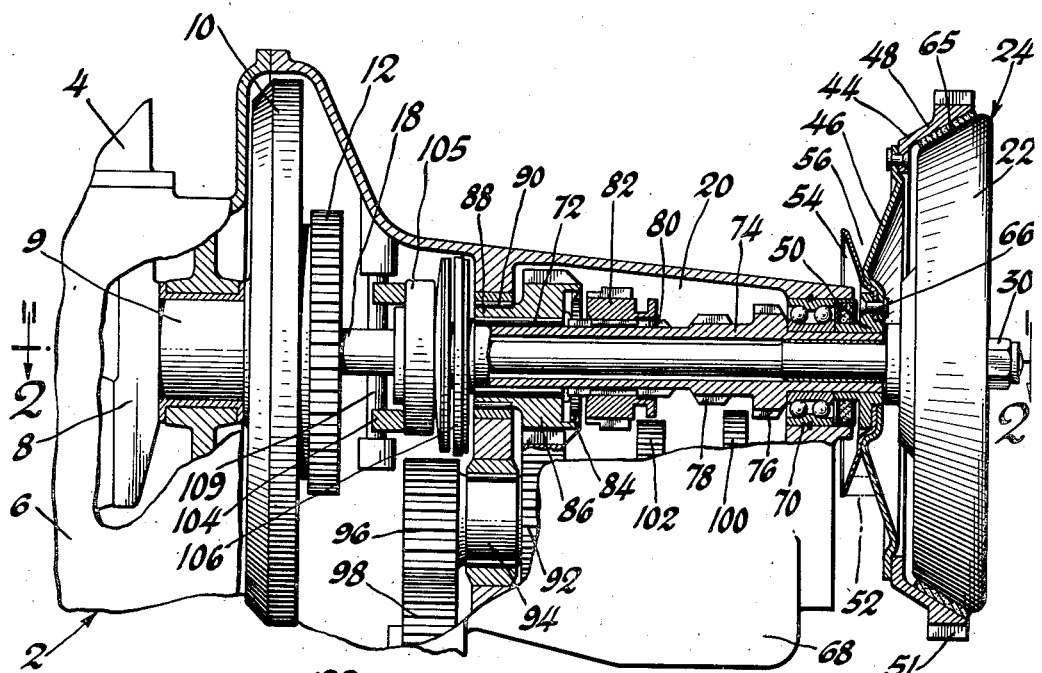
Figure 1 is a sectional view through the transmission and clutch with a portion of the engine shown, the vibration damper of the invention being shown in elevation.

Referring to the drawing, the numeral 2 indicates an internal combustion engine of any suitable type. In the present instance the engine is a four cylinder, two-cycle engine having U cylinders. The cylinder housings are indicated at 4 and the crankcase at 6; the crankcase having the crankshaft 8 journaled therein in the bearings 9. The crankshaft has the flywheel 10 which has formed integral therewith, a gear 12 used to drive the auxiliaries of the engine such as the fuel pump, distributor, blower, etc. The flywheel is provided with a slot (not shown) in which there is slidably received a tongue 16 on the end of the slidable and shiftable shaft 18. The shaft 18 passes through the transmission 20 and has secured on its outer end the driving member 22 of a cone clutch indicated as a whole at 24. The drive member 22 is provided with the usual hub splined to the end of the shaft 18 and is held thereon by a nut 30 threaded on the end of the shaft. The driven member of the clutch is indicated at 44 and comprises a web 46, the outer steel ring 48 and the hub 50. The ring 48 has the peripheral teeth 51 to enable the starting motor (not shown) to rotate the clutch to start the engine 2. In order to form a pulley to drive the fan belt 52, an additional plate 54 is formed to the shape shown in Figure 1 and is suitably secured to the web 46 to form a V groove 56 to receive the belt 52. The usual clutch lining is shown at 65.

The hub 50, the inner edges of the web 46, and the plate 54 are secured together by means of the rivets 66.

The transmission case is indicated at 68 and is provided with the end bearings 70 and 72 in which there is turnably mounted the shaft or quill 74, the shaft 74 in turn forming a bearing for the driving shaft 18 of the motor. Integrally formed with the shaft 74 is the low or first speed gear 76 and reverse gear 78. The shaft has the splined portion 80 on which there is slidably mounted the gear 82, adapted to mesh with the internal teeth 84 of the gear 86. The gear 86 has a hub 88 adapted to turn in the bearings 72 and 90. By shifting the gear 82 into engagement with the teeth 84, a direct drive of the vehicle is accomplished by driving the gear 92 on the shaft 94 parallel with the shaft 74. The shaft 94 has the gear 96 at its end which gear meshes with an idler gear 98 which is connected to the usual ring gear of the differential (not shown). To drive in first speed the gear 100 is shifted to the right to mesh with the gear 76 and for reverse the gear 100 is shifted to the left to mesh with an idler gear (not shown) which in turn is driven from the gear 78. The second speed is accomplished by shifting the gear 82 to the right to mesh with the gear 102.

Figure 3:
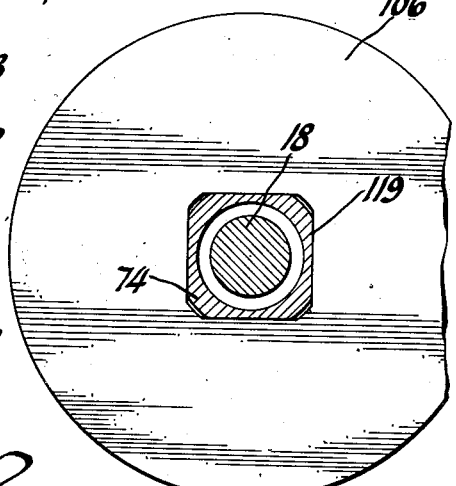
Figure 3 is a detailed view on the line 3—3 of Figure 2 showing the manner of mounting the Belleville washers on the transmission shaft or quill.

The driving member 22 of the clutch 24 is also the shiftable member of the clutch and in this instance, the member 22 is shifted by longitudinally sliding the driving shaft 18. This is accomplished by the fork 104 which operates on the bearing cage 105 of the ball bearing 107, to slide the shaft 18 to the right (Figure 1) against the tension of the Belleville washers 106. The fork 104 has its end abutting the stationary pin 109 which serves as a fulcrum for the shifter fork. When the clutch fork 104 is operated, it will compress the Belleville washers 106 and shift the shaft 18 to the right to throw the clutch member 22 to the right to cause the inclined surfaces of the cone clutch to disengage. When the fork is released, the Belleville washers 106 will expand to push the shaft 18 to the left to cause the clutch member 22 to engage the clutch member 44. The Belleville washers 106 therefore, tend constantly to keep the clutch in engagement. The Belleville washers 106 are secured to the shaft 74 by the squared connection shown at 119 in Figure 3.

Figure 2:
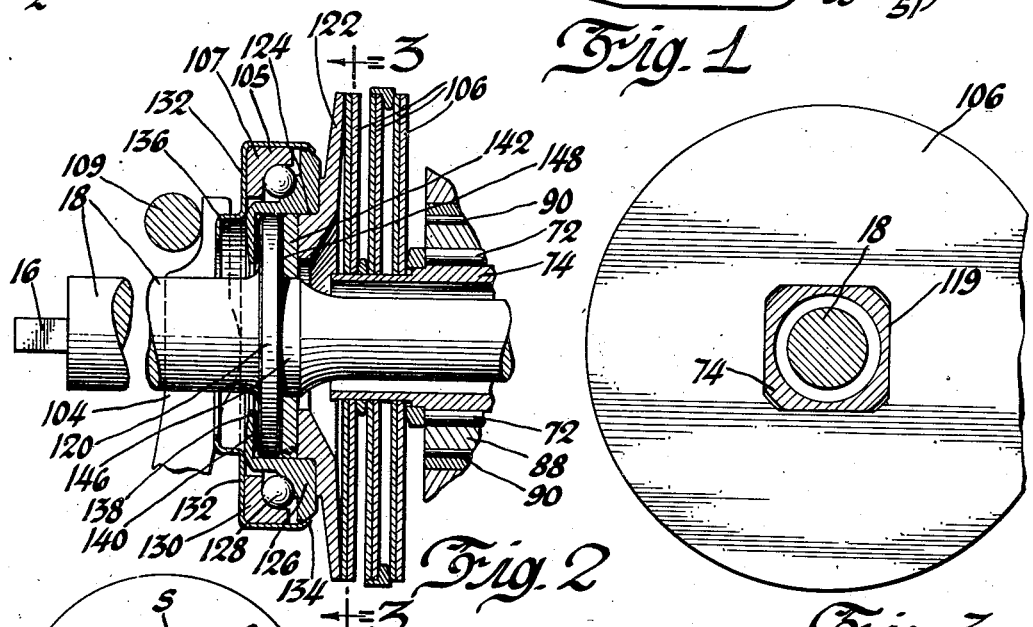
Figure 2 is an enlarged sectional detailed view of the vibration damper and the adjacent construction, the section being taken on the line 2—2 of Figure 1.

Referring to Figure 2, the shaft 18 has formed thereon, the collar 120 having its side faces machined. This collar is preferably an integral part of the shaft. The Belleville washers 106 have the plate 122 at the left thereof, the plate having a shoulder 124 on which there rests the inner race 126 of the ball bearing 107. The inner race 126 is suitably rounded to receive the balls 128, while the outer race 130 is likewise suitably rounded and fits over the balls 128. A retainer 132 having its inner end inwardly flanged as at 134 around the inner race 126, holds the two races together. The retainer 132 has a shoulder 136 at its free end and over the shoulder 136 the tines of the fork are received.

The inner race 126 has the annular flange 138 formed thereon, which flange extends on the machined side of the collar 120 adjacent the engine. This flange has a tin facing 140 to act as a friction material to retard the vibrations of the shaft 18, due to the impulses from the crankshaft. At the opposite face of the collar 120 or at the side facing the clutch, there is interpositioned between the plate 122 and the collar 120, the floating washer 142. This washer fits over the shoulder 146 on the shaft and has a copper-lead friction facing 148 where it abuts the side of the collar 120. Inasmuch as the Belleville washers constantly will urge the washer 142 against the side face of the collar 120, the copper-lead friction facing will act to retard the vibrations of the shaft due to the impulses of the engine.

Figure 4:
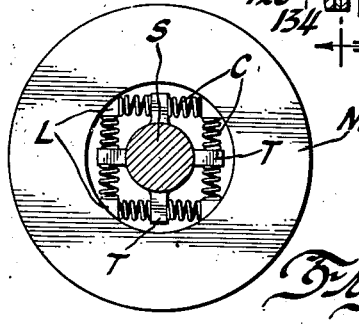
Figure 4 is a diagrammatic view showing the elementary way of balancing a shaft.

In Figure 4 there is shown in a general way, a mass M surrounding a shaft S, the vibration of which it is desired to dampen. The mass has formed therein, a plurality of lugs L which extend toward the shaft. The shaft has formed thereon a plurality of teeth T, one tooth projecting between each pair of lugs. Between the teeth and the lugs, there are positioned the coil springs C. Friction surfaces (not shown) are spring-pressed against opposite faces of the mass M. As the shaft S rotates and is given a sudden impulse, the teeth T will compress the coil springs C against the resistance offered by the friction surfaces, and as the impulse stops, the energy stored in the spring will cause the mass to move against the frictional resistance to dampen the vibration. The springs themselves, when they are being compressed, will resist the vibration because of the inertia offered by the mass M. In the invention shown on the drawing, the clutch 24 forms the mass M, while the shaft 18 itself takes the place of the coil springs C. The Belleville washers 106 act as the springs which compress the friction surfaces against the mass M. When the engine 2 gives an impulse to the crankshaft 8, this impulse will be transmitted to the shaft 18, but due to the friction caused by the pressure of the Belleville washers on the floating washer 142 and the friction surface 148, there will be increased friction created which will produce work. This amount of friction and work will be resisted by the friction surfaces 148. When the clutch is being disengaged the pressure of the fork 104 against the cage 105 constantly will urge the inner race 126 to the right to cause the friction surfaces at 140 to bear against the engine side of the collar 120 and additionally aid in creating friction to dampen the vibrations in the shaft.

The twists or oscillations of the shaft are therefore dampened by the mass in the form of the clutch 24, aided by the spring which is the inherent resiliency of the shaft, plus the frictional resistance offered by the work caused by the friction between the sides of the collar and the friction surfaces 140 and 148. When the vehicle is in motion and the transmission is in use, the shafts 18 and 74 will rotate at the same speed and in the same direction, therefore should the shaft 18 twist or tend to run ahead of or behind the shaft 74, this motion will be communicated through the clutch to the shaft 74 and from the shaft 74 to the collar 120 through the Belleville washers and the friction surface 148, where it will be counteracted to suppress the twist or vibration.

I claim:

1. In a vibration damper for the flexible rotatable shaft transmitting the power from an engine to a transmission through a clutch, said flexible shaft being shiftable to cause the disengagement of the clutch and being surrounded by a shaft of the transmission, a plurality of spring means free of the flexible shaft and secured to the transmission shaft and constantly urging the clutch in engaged position, means adjacent the springs to enable the shifting of the shiftable shaft to compress the springs and disengage the clutch, and friction means interrelated with the shifting means and the springs to dampen vibrations in the flexible shaft due to impulses of the engine.

2. In a vibration damper for the flexible rotatable shaft transmitting the power from an engine to a transmission through a clutch, said flexible shaft being shiftable to cause the disengagement of the clutch and being surrounded by a shaft of the transmission, a plurality of spring means free of the flexible shaft and secured to the transmission shaft and constantly urging the clutch in engaged position, means adjacent the springs to enable the shifting of the shiftable shaft to compress the springs and disengage the clutch, an interengaging friction means on the shaft and between the shaft and the springs to dampen the vibrations of the flexible shaft due to impulses of the engine.

3. In a vibration damper for a flexible rotatable shaft driven from one of its ends, a hollow shaft surrounding said flexible shaft, a clutch at the end of said flexible shaft, one member of the clutch connected to the hollow shaft and the other member connected to the flexible shaft, means at the driven end of the flexible shaft constantly urging the clutch into engaged position, means at the driven end of the flexible shaft to shift the shaft to disengage the clutch, and a friction means between said two means to dampen vibrations of the shaft.

4. In a vibration damper for a flexible rotatable shaft, a mass at one end of the shaft, means to drive the shaft from the other end, a means to shift the shaft, means constantly urging the mass to a definite position, means interconnecting the mass and the last named means, and friction surfaces between the shifting means and the urging means to dampen the vibrations of the shaft caused by the driving means.

5. In a vibration damper means for a rotatable shaft, a collar rigid with said shaft, springs surrounding said shaft for pressing against one face of said collar, a shifting cage on the other side of the said collar and mounted on said shaft, a friction means between said collar and said springs and between said collar and said cage to dampen vibrations in the shaft.

6. In a vibration damping means for a rotatable flexible shaft, a collar rigid with the shaft, a shifting cage on one side of the collar, friction material on the cage, a floating washer on the other side of the collar, friction means between the washer and the collar, and means to press the cage and the washer against the collar to produce friction to dampen the vibrations of the shaft.

7. In a vibration damping means for a rotatable flexible shaft, a collar rigid with the shaft, a second shaft surrounding the flexible shaft, a plurality of springs on the end of the second shaft and turnable therewith, said springs mounted adjacent the collar on the first shaft, a plate between the springs and the collar, a washer between the plate and collar friction means on the washer between the washer and the collar, a bearing cage on the other side of the collar and extending around the collar and against the plate, said cage adapted to be moved to depress the springs, a friction means between the collar and cage, said friction means damping the vibrations of the shaft.

8. In a vibration damper for a rotatable shaft, a collar rigid with the shaft, a floating washer on one side of the collar, a friction facing on the washer between the collar and the washer, a cage around the shaft and having a face abutting the other side of the collar, a friction facing on the abutting face, and means to press said friction faces against the collar to dampen the vibrations in the shaft.

9. In a vibration damper for a rotatable, shiftable shaft, a collar rigid with the shaft, a floating washer on one side of the collar, a friction facing on the washer between the collar and the washer, a plate rotatable and shiftable with the shaft on the other side of the collar, friction facing on the plate side abutting the collar, and means to force said plate and washer against the collar to cause friction to dampen the vibrations in the shaft.

10. In a vibration damper for a rotatable, shiftable and flexible shaft having a clutch connected thereto, said shaft being driven from one end by an engine and having one member of the clutch secured to the other end, a shaft surrounding said shiftable shaft and having the second member of the clutch secured thereto, a collar rigid with the flexible shaft, a plurality of Belleville washers secured to the second shaft, means between the washers and the collar to cause the washers to act thereon and tending constantly to keep the clutch in engagement, a friction facing between the collar and said means, a bearing cage surrounding the first shaft and abutting against said means and adapted to be moved to compress the washers and to shift the first named shaft to disengage the clutch, and a friction facing between said cage and the other side of said collar, said friction facing damping the vibrations in the said shaft.

ERIC OLLE SCHJOLIN.